May 19, 1931. H. E. BLOMGREN 1,806,143
PISTON RING
Filed March 14, 1923
Fig. 1-a.
Fig. 1.
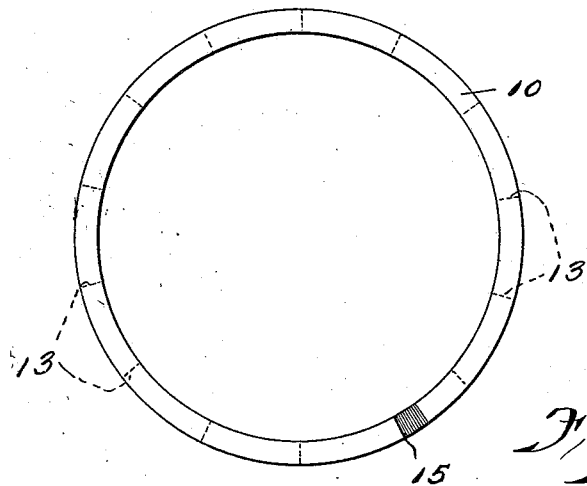
Fig. 2.
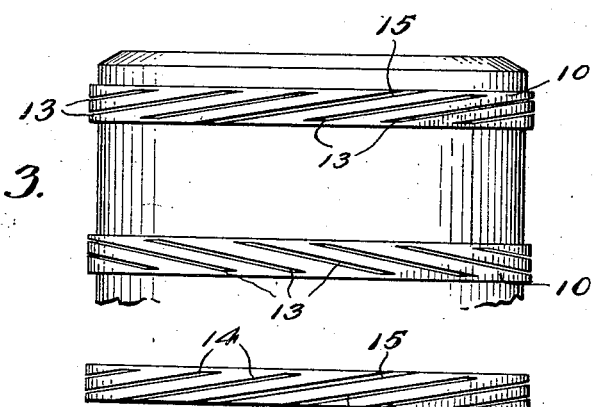
Fig. 3.
Fig. 4.
Inventor
Henry E. Blomgren,
By H. L. Woodward,
Attorney.

Patented May 19, 1931

1,806,143

UNITED STATES PATENT OFFICE

HENRY E. BLOMGREN, OF BROOKLYN, NEW YORK, ASSIGNOR, BY DIRECT AND MESNE ASSIGNMENTS, TO THE SIMPLEX PISTON RING COMPANY OF AMERICA, INC., OF CLEVELAND, OHIO, A CORPORATION OF OHIO

PISTON RING

Application filed March 14, 1923. Serial No. 624,960.

This is a continuation in part of my pending application, Serial #531,559, filed January 25th, 1922.

The invention has for an object to effect improvements in piston rings used ordinarily in internal combustion engines having reciprocating pistons, and particularly rings of that type in which two side portions engaging the sides of the piston groove are compressible longitudinally of the piston, in addition to the ring having the function of expanding radially against the cylinder.

It is a particular purpose to provide a one-piece ring which will develop by compression, or by expansion and contraction of metal, relative movement in the side portions of a rotary character. A further aim is to provide such a ring which will have a tendency to rotate bodily on the piston, especially by reason of the relative or compression movement of the opposite side portions.

In the operation of ordinary internal combustion engines having pistons fitted with split rings, it has been found that by friction, or the impact of gases, or both, the rings in some instances change position by a rotary movement on the piston, and often the splits in all the rings of a piston will become positioned in the same longitudinal element or line of the periphery of the piston, and so remain, with resultant rapid leakage of gas under compression because of the direct path provided for such escape.

A still further object of importance is to so construct rings that they may be arranged so that mutually adjacent rings will rotate in opposite directions, thus obviating the liability of the splits becoming lined up as last mentioned.

Additional objects, advantages and features of invention may be apparent from the following description and from the drawings, wherein, Figure 1 is a side elevation of a ring constructed in accordance with my invention, Fig. 1—a is a modified form thereof, Fig. 2 is a top view of my ring, Fig. 3 is a side elevation of a piston having the first mentioned form of rings incorporated thereon, Fig. 4 is a side elevation of a further modified form of ring.

There is illustrated a ring 10 which in its general contour and dimensions may conform to the familiar practice, and is adaptable to various requirements. It is shown with the familiar diagonal split or joint permitting the expansion of the ring to slip over a piston, but the form of the joint may be varied if desired. This ring may also be formed of approximately the same materials heretofore employed in solid rings of this general contour. It is also contemplated to make the split or joint of greater inclination than heretofore, whereby, owing to the greater area in the opposed surfaces at the split, when oil is interposed, there will be greater resistance to leakage of gases therethrough than in the short cut style of ring.

The ring comprises a seal body having formed therein a multiplicity of elongated slots 13, which extend diagonally from closely adjacent one side of the ring to a corresponding position adjacent the other side, and opening through both the inner surface and the outer or peripheral surface of the ring. The end of each slot lies intermediately of the length of the one next adjacent in that direction, excepting at the ends of the ring where one slot at each side stops close to the more extended part of the ring, while a short slot 13′ is formed opening through the end of the ring having a position with respect to the adjacent slot corresponding to the positions of like parts of other slots (see Fig. 1—a). The size and length of the slots are such that the ends thereof all lie adjacent the middle parts of next adjacent slots, and where two slots parallel each other an intervening attenuated partition is formed which may be readily flexed. The top and bottom side portions of the ring are thus supported at frequent intervals, and they are also given a measure of rigidity by reason of the thickened parts which occur between the mutually adjacent ends of the slots. The metal of the said side portions will thus not bend readily. Preferably, the ends on the ring are formed with the same inclination as the slots, as in Fig. 1. In a ring having a peripheral face one-quarter of an inch in width, I customarily make the slots about one and one-quarter inches in length, and the width of the slot about one thirty-second of an inch in width when the ring is relieved from compression. The slots extend to within about one-sixteenth of an inch from the sides of the ring. The split or miter 15 of the ring is formed at the same inclination as the slots, and the next adjacent slots at each side are spaced about the same distance from the split as there is between the slots.

In the use of this ring, it may be readily compressed manually for entrance to the grooves of a piston and is preferably formed about one one-thousandth of an inch wider than the groove in which it is to be used, so that it requires slight compression for entrance to the groove. In applying, it may be slipped over the piston in the customary manner, and when positioned over the groove into which it is to be fitted, it may be compressed either manually or by means of pliers, for entrance to the groove.

In the compression of the ring, one side will be given a slight rotary movement relatively to the other, and this will be of value in causing rings to creep in the grooves and wear to a snug and continuous bearing upon the sides of the piston grooves by the working which will occur incident to use of the rings, either by gas pressure, vibration, or expansion and contraction of the metal in the diagonal parts. Also, the inclination of these parts will have an effect in the rotation of the rings by frictional engagement with the walls of the cylinder.

If it is desired to vary the resistance of the ring to compression, this is preferably attained by increasing or decreasing the number of slots and their resultant spacing, although change in length and inclination or variation of the width of the slots may be utilized to the same end.

In making up sets of these rings for retail sale, one or more rings are made with their inclined elements extending in different directions, and preferably opposite directions, from like elements of the other rings, so that adjacent rings on the same piston may be arranged to creep or rotate in opposite directions, as in Fig. 3. This rotary movement will not of course be rapid, and will involve but slight wear, but still be sufficient to prevent "freezing" by carbon accumulation and to maintain a smooth continuous bearing.

This arrangement will tend to prevent the splits of adjacent rings from remaining in line for any extended period in case the rings become so worn as to permit leakage through the split.

It may be found desirable to modify the structure of the ring as indicated in Fig. 4, where the slots 14 extend entirely through one side of the ring, and would preferably be adjusted in the piston so as to effect the retention of more or less oil than is held by the ordinary ring. Thus, by adjusting the open ends of the slots toward the head of the piston more oil will be fed to the upper walls of the cylinder, while if the open ends of the slots are directed toward the skirt less oil will be retained. Thus excessive or deficient oil supply to particular cylinders may be remedied or conserved.

What is claimed is:—

1. A packing ring comprising a body constructed to be fitted in the groove of a piston or the like, and having a multiplicity of longitudinally arranged slots therein opening through the inner and outer faces of the ring, and extending in overlapped relation a considerable distance circumferentially from adjacent one side of the ring to a like point adjacent the opposite side, whereby two continuous groove-fitting parts and intervening integral flexible elements are formed extending diagonally from one side part to the other of the ring and yieldable to longitudinal primary compression forces for the purposes indicated.

2. A ring for the purposes described comprising a body portion formed with continuous groove-wall fitting parts and inclined elements extending therebetween yieldable to normal primary compression forces acting longitudinally of a piston, whereby creeping action may develop.

3. A split packing ring provided with a series of slits extending through its entire thickness, each slit of said series being closed at both ends, said slits being disposed in planes inclined to the plane of the ring, the arrangement of the slits relatively to one another being such as to make the ring axially compressible.

4. A split packing ring provided with a series of slits extending through its entire thickness in a radial direction, said slits being disposed in planes inclined to the ring and being closed at both ends.

5. A split packing ring provided with a circumferentially extending series of slits, said slits being closed at both ends and inclined to the axis of the ring, one end of each slit of the series overlapping an end of the next adjacent slit of the series.

6. A split packing ring provided with a series of slits extending through its entire thickness in a radial direction, said slits being disposed in planes intersecting the plane of the ring at angles not substantially greater than 45°.

7. A packing ring provided with a split or gap at one point to make it radially expansible, the gap being so arranged that the ends of the ring overlap, said ring being provided with slits extending through its entire radial thickness to render it axially compressible, said slits being inclined to the plane of the ring, certain of said slits extending into the overlapped end portions of the ring.

8. A packing ring having a gap at one point, the ends of the ring overlapping at the gap to break the joint, the ring being provided with slits extending through its radial thickness and staggered relatively to one another to render the ring axially elastic, some at least of said slits being inclined to the plane of the ring, the endmost slits stopping short of the gap so that the extreme ends of the ring are solid.

9. A one-piece spring piston ring having overlapped slots elongated in the direction of the circumference of the ring, extending through the ring in a radial direction, the slots being parallel and inclined to a radial plane at right angles to the axis and overlapped for a considerable portion of their length.

10. A one-piece split spring piston ring having overlapped slots elongated in the direction of the circumference of the ring, extending through the ring in a radial direction, the slots being parallel and inclined to a radial plane at right angles to the axis and overlapped for a considerable portion of their length, the slots extending throughout the length of the ring and to and through the circumferential ends of the ring.

11. A one-piece split spring piston ring having a series of overlapped slots elongated in the direction of the circumference of the ring extending through the ring in a radial direction, the slots being slightly inclined to a radial plane at right angles to the axis and overlapped for a considerable portion of their length, the series of overlapping slots extending the entire circumferential length of the ring.

In testimony whereof I have affixed my signature.

HENRY E. BLOMGREN.